United States Patent [19]
Holter

[11] Patent Number: 5,727,832
[45] Date of Patent: Mar. 17, 1998

[54] END EFFECTOR FOR TRANSFERRING ARTICLES

[75] Inventor: Carl F. Holter, Waukesha, Wis.

[73] Assignee: ABB Flexible Automation, Inc., New Berlin, Wis.

[21] Appl. No.: 571,215

[22] Filed: Dec. 12, 1995

[51] Int. Cl.⁶ .................................................. B25J 15/06
[52] U.S. Cl. .................. 294/64.1; 294/907; 901/40
[58] Field of Search .................. 294/2, 64.1, 65, 294/907; 269/21; 414/627, 737, 752, 793, 797; 901/40

[56] References Cited

U.S. PATENT DOCUMENTS

| | | | |
|---|---|---|---|
| 2,880,030 | 3/1959 | Horn | 294/65 |
| 3,063,746 | 11/1962 | Oakes | 294/64.1 |
| 3,139,301 | 6/1964 | Olson et al. | 294/64.1 |
| 3,289,860 | 12/1966 | Dean | 294/64.1 X |
| 3,343,690 | 9/1967 | Dean | 294/65 X |
| 3,411,641 | 11/1968 | Dean | 294/64.1 X |
| 3,747,784 | 7/1973 | Dean | 294/64.1 X |
| 3,926,466 | 12/1975 | Carpenter | 294/64.1 |
| 4,006,929 | 2/1977 | Barker | 294/64.1 |
| 4,630,987 | 12/1986 | Poersch et al. | 414/32 |
| 4,741,567 | 5/1988 | Zimmer et al. | 294/2 |
| 4,789,295 | 12/1988 | Boucher et al. | 414/497 |
| 5,141,274 | 8/1992 | Hayden et al. | 294/2 |
| 5,207,553 | 5/1993 | Konagai | 414/737 |
| 5,326,218 | 7/1994 | Fallas | 414/733 |
| 5,330,311 | 7/1994 | Cawley et al. | 294/64.1 X |
| 5,387,068 | 2/1995 | Pearson | 414/404 |
| 5,403,056 | 4/1995 | Wallace | 294/98.1 |

*Primary Examiner*—Johnny D. Cherry
*Attorney, Agent, or Firm*—Godfrey & Kahn, S.C.

[57] ABSTRACT

An end effector for use with an industrial robot and capable of holding a stack of substantially flat, folded articles. The end effector includes a body which defines a vacuum chamber. The vacuum chamber has a port which may be coupled to a vacuum source and an opening or vacuum face which is positioned in spaced relation relative to the port. Sealing material is mounted on a portion of the peripheral edge of the vacuum face, and a first blade is mounted on the peripheral edge of the vacuum face adjacent to the strip of sealing material. A second blade is mounted on a third portion of the peripheral edge of the vacuum face in axial opposition to the first blade so that the two blades face one another. A second strip of sealing material is mounted on a fourth portion of the peripheral edge of the vacuum face. The first and second blades and sealing material ensure a proper vacuum seal between the end effector and the articles of interest. Preferably, both of the blades are grooved and at least one of the blades is movable by means of a linear slide.

28 Claims, 4 Drawing Sheets

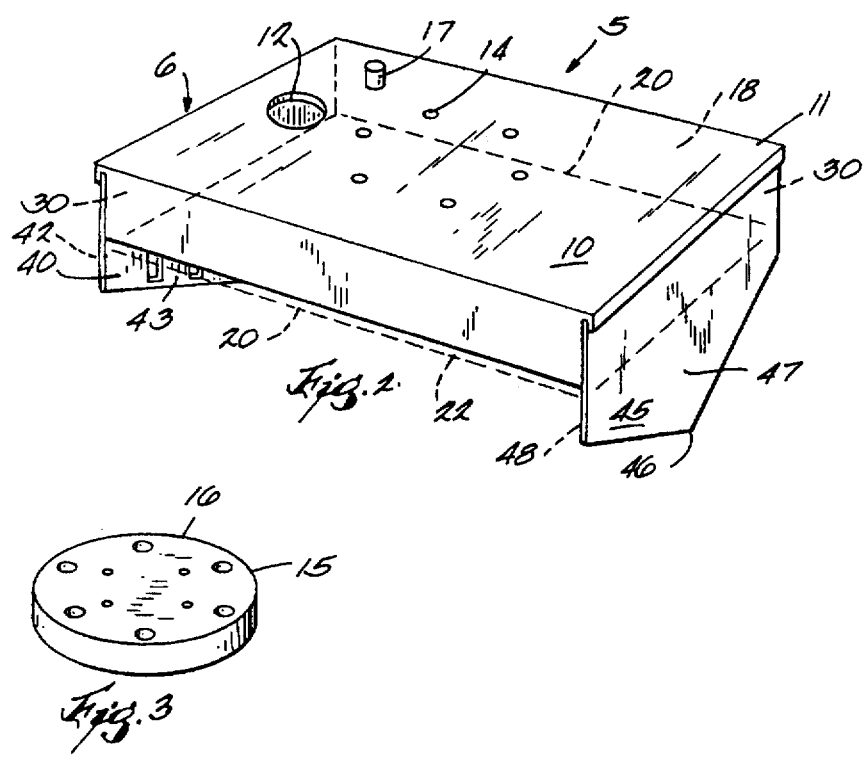
Fig. 2
Fig. 3
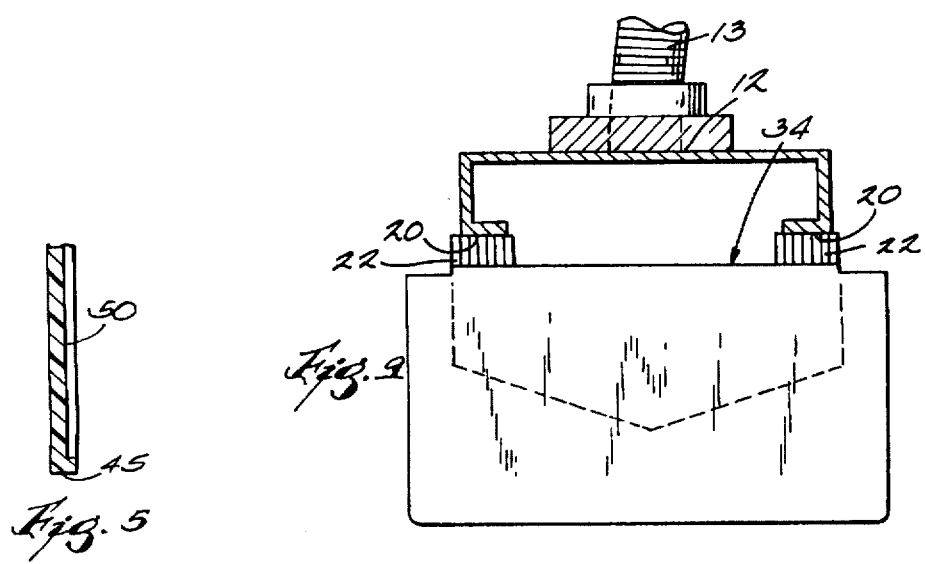
Fig. 5
Fig. 4

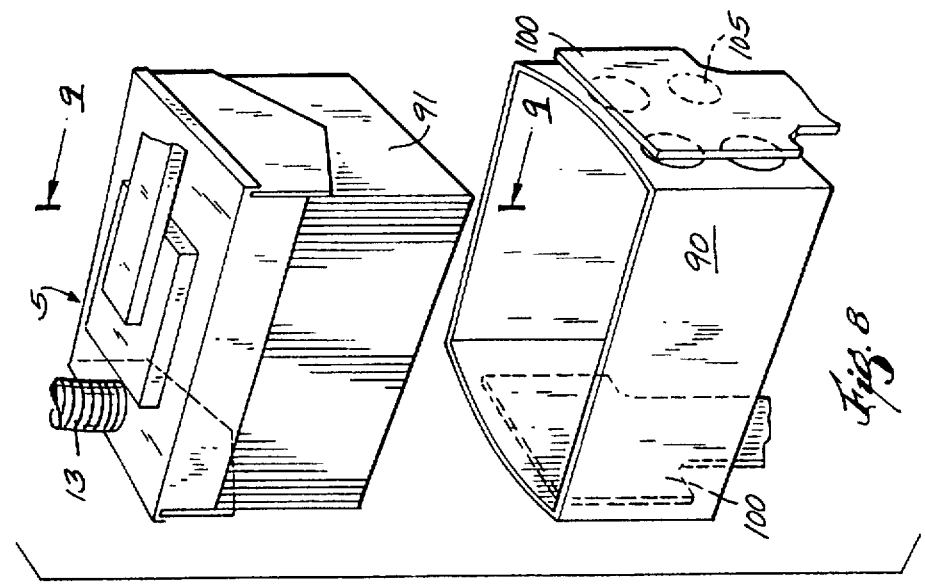
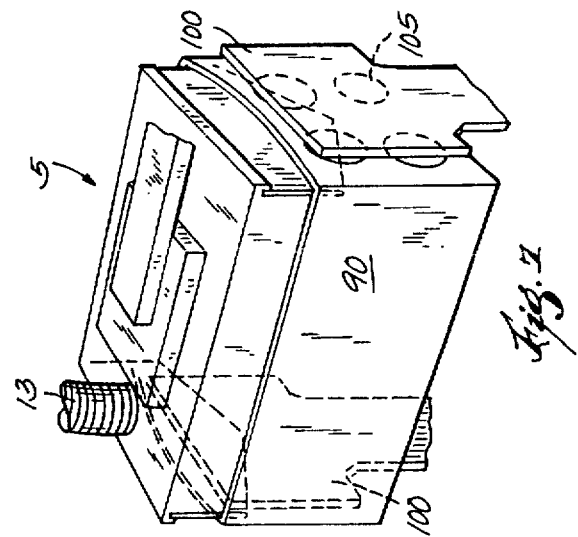
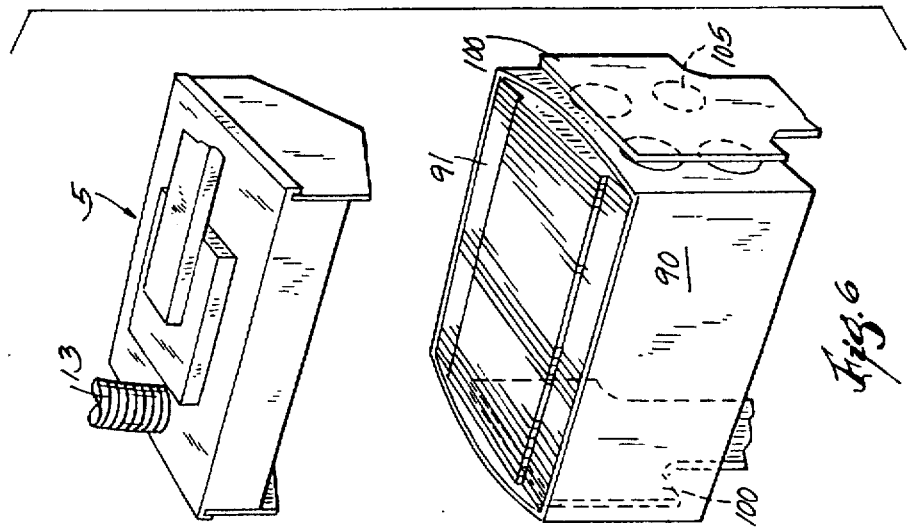

END EFFECTOR FOR TRANSFERRING ARTICLES

BACKGROUND OF THE INVENTION

1. Field of the Invention

The present invention relates to devices for transferring generally flattened articles from a shipping container to a desired location. More particularly, the present invention relates to a robotic arm having an end effector capable of holding a stack of generally flattened articles so that they may be moved from one location to another by the motion of a robot arm.

2. Description of the Prior Art

In bottling, canning, and other industries, large amounts of packaging material such as folded, flat, paperboard containers must be handled. Typically, packaging material arrives in relatively large shipping containers or corrugated cardboard boxes. The boxes are shipped on pallets and it is necessary to remove the packaging material from the corrugated boxes on the pallets to automated processing lines where, for example, folded paperboard containers are opened, filled with beverage cans, and then sealed.

In most instances, the task of removing the packaging material is carried out manually. The task is relatively strenuous and tedious and can literally be "back-breaking work," as the continued lifting and moving of packaging material can cause back injuries. Of course, many workers must be employed to remove the folded containers from their boxes and feed the folded containers into processing lines.

In an effort to reduce salary and injury costs, there have been some attempts to automate this process by using robots. As is known in the art, industrial robots may be fitted with various claws and other grasping devices to pick up and move articles of interest. Most of the attempts in the area of flat packaging containers have not been satisfactory, because the mechanical grasping and contacting of the flattened paperboard containers causes them to be scratched, marked, or otherwise marred or damaged while they are handled.

As can be appreciated, the paperboard containers serve a functional purpose as product carriers. However, the containers must also be aesthetically attractive and visually appealing. To this end, such containers often have elaborate printing on their surfaces. Filled containers are often stacked so as to create aisle displays in supermarkets. Further, the paperboard containers may also be used as product dispensers, such as, for example, facial tissue boxes. Thus, it is of great importance that any device developed to handle folded paperboard containers or similar items do so without damaging them or the printing or other indicia on their surfaces.

Accordingly, there is a need for a device which may be used to handle stacks of relatively flat articles without damaging them.

OBJECTS AND SUMMARY OF THE INVENTION

Therefore, it is an object of the present invention to provide a device which may be used to handle stacks of relatively flat articles without damaging them.

A further object of the present invention is to provide an end effector for use with a robot where the end effector is capable of lifting a plurality of stacked, substantially flat articles.

A further object of the present invention is to provide an end effector for use with a robot where the end effector is in the form of a vacuum chamber which is capable of lifting a plurality of stacked, substantially flat articles when a source of vacuum is applied to the vacuum chamber.

These and other objects and advantages are achieved in an end effector including a body which defines a vacuum chamber. The vacuum chamber has an opening or port which is capable of being coupled to a vacuum source. The vacuum chamber has a large opening or vacuum face with a peripheral edge and is positioned substantially opposite and in spaced relation relative to the port. In operation, the vacuum source pulls air past and through the vacuum face into the vacuum chamber. The air then leaves the vacuum chamber through the port.

A strip of sealing material is mounted on or near a portion of the peripheral edge of the vacuum face. The strip of sealing material helps maintain a vacuum seal between the vacuum face and the handled articles of interest. A seal extension or blade is mounted on or near a second portion of the peripheral edge of the vacuum face, adjacent to the strip of sealing material.

In one form, the vacuum chamber is rectangularly-shaped and includes a base having a peripheral edge and a first bore which is designed to be coupled to a vacuum source. Two first side walls are mounted on, and substantially perpendicular to, the base, near its peripheral edge. Each of the first side walls have a strip-like surface, and a first strip of sealing material is mounted on each of the strip-like surfaces of the first side walls.

Two second side walls are also mounted on, and substantially perpendicular to, the base, near its peripheral edge. The base and first and second side walls are preferably made from steel and may be welded, mold cast, or otherwise constructed so as to be integral with one another to form a unitary vacuum chamber.

A first seal extension or blade is mounted on one of the second side walls, and a second seal extension or blade is mounted on the other of the second side walls. The blades are mounted on the vacuum chamber in axial opposition to one another so as to face one another. The first and second blades each have a first, grooved surface and a second, substantially smooth surface. Preferably, the blades are shaped to have some type of point, and manufactured from a polymeric material.

The vacuum chamber is designed to be mounted on the end of a robot arm and includes a plurality of second bores. A flange having a plurality of bores is used to facilitate the mounting of the vacuum chamber to the arm. Bolts are placed in the plurality of second bores of the base, through the plurality of bores of the flange, and into the robot arm.

Further objects and advantages of the present invention will become more apparent from the following detailed description of the preferred embodiment taken in combination with the accompanying drawings.

BRIEF DESCRIPTION OF THE DRAWINGS

FIG. 2 is a perspective, side elevation view of an end effector constructed according to one embodiment of the present invention.

FIG. 3 is a perspective view of a flange for use with the end effector shown in FIG. 2.

FIG. 5 is a cross-sectional view of a blade of the end effector of the present invention taken along the line 5—5 in FIG. 4.

FIG. 6 is a perspective view of the end effector of the present invention shown in a position ready to pick up a stack of folded, substantially flat articles from a container.

FIG. 7 is a perspective view of the end effector of the present invention shown partially inserted into a container containing a stack of folded, substantially flat articles.

FIG. 8 is a perspective view of the end effector of the present invention shown holding a stack of folded, substantially flat articles removed from the container.

FIG. 9 is a cross-sectional view of the end effector of the present invention shown holding a stack of folded, substantially flat articles and taken along the line 9—9 in FIG. 8.

DESCRIPTION OF THE PREFERRED EMBODIMENT

Figure 1:
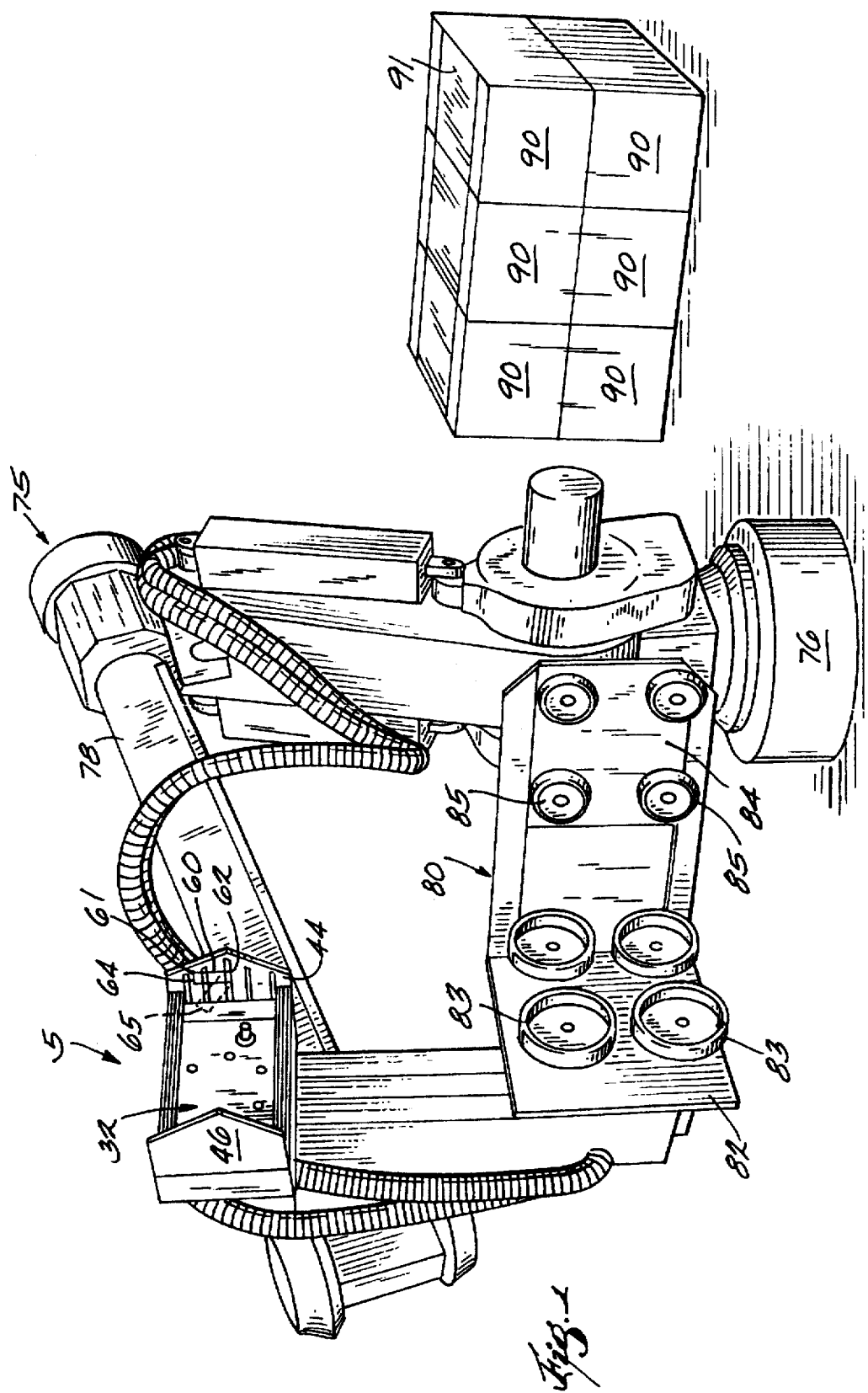
FIG. 1 is a perspective, environmental view of the end effector of the present invention shown mounted on an industrial robot.
Figure 4:
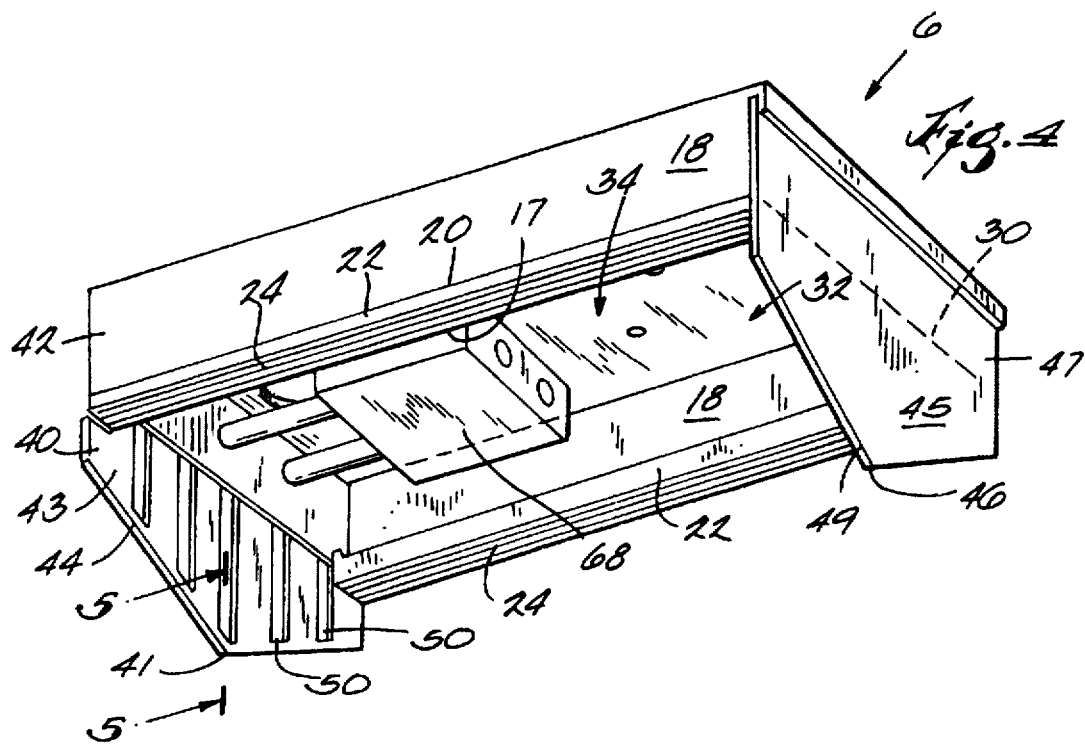
FIG. 4 is another perspective view of the end effector shown in FIG. 2, showing the inside of the vacuum chamber provided by that embodiment of the present invention including a linear slide for moving one of the blades.
Figure 4A:
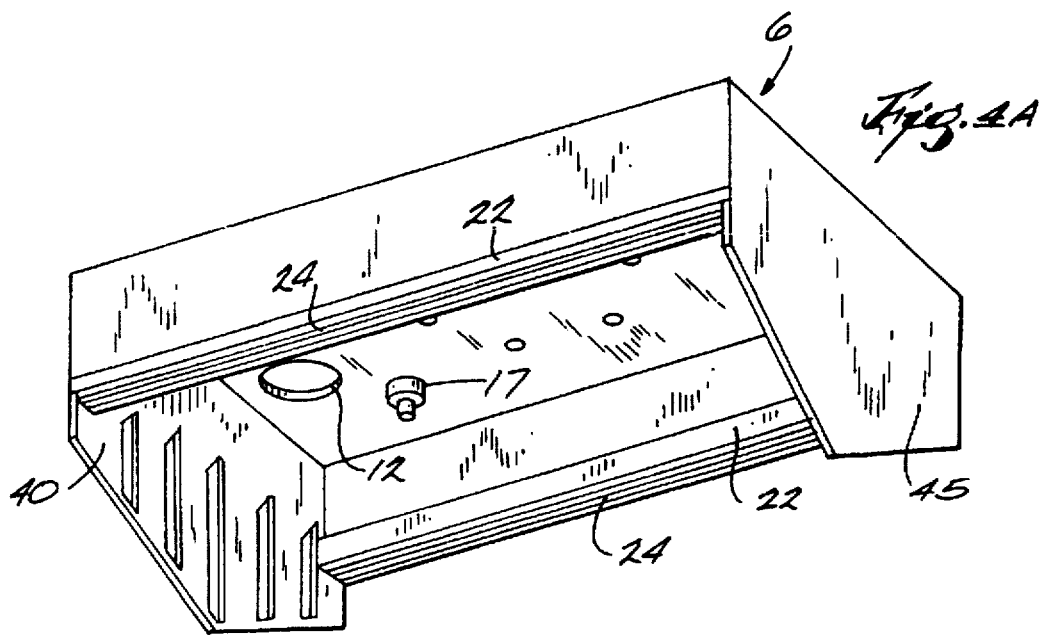
FIG. 4A is a perspective view of an alternative embodiment of the end effector having an integral or unitary vacuum chamber.

Referring more particularly to the drawings, an end effector 5 is shown in FIG. 1. As best seen by reference to FIG. 2, the end effector 5 has a body 6. The body 6 includes a base 10 having a peripheral edge 11 and a first bore 12. The first bore 12 is capable of being coupled to a vacuum source (not shown) through a vacuum hose 13 (FIG. 9). The base 10 also has a plurality of second bores 14 which are arranged in a predetermined pattern. A flange adapter 15 having a plurality of bores 16 is shown in FIG. 3. In operation, the flange adapter 15 is used to facilitate the bolting of the base 10 to an industrial robot (discussed below). A vacuum sensor 17 (FIGS. 2 and 4A), which may take the form of an analog sensor or vacuum switch, is mounted on the base 10 through a bore (not shown). The vacuum sensor 17 may be coupled in data transmission relation to a microprocessing unit in an industrial robot.

A pair of first side walls 18 (FIG. 4) is mounted on the base 10, near the peripheral edge 11. The first side walls 18 are mounted on the base 10 so as to be substantially perpendicular thereto. Each of the first side walls 18 has a strip-like surface 20 at the edge distal from the base 10. A strip of sealing material 22 is mounted on the strip-like surface 20 of each of the first side walls 18. The sealing material 22 has a ridged surface 24. The sealing material 22 may be any one of numerous rubber seals known in the art. A suitable rubber seal may be obtained from Trim-Lok, Inc., Buena Park, Calif., under the trademark TRIM-LOK, product number X-103.

A pair of second side walls 30 (FIG. 4) is mounted on the base 10, substantially perpendicular thereto, near the peripheral edge 11, and also substantially perpendicular to the first side walls 18. The base 10, first side walls 18, and second side walls 30 may be made from various materials, including metal, fiberglass, and polymeric materials. Preferably, these components are manufactured from stainless steel. They may be welded, molded, cast or otherwise formed together to create a unitary vacuum chamber 32. As shown in FIG. 1, the vacuum chamber 32 is designed to be mounted on the end of a robot arm 78 (discussed below) by the flange adapter 15. Bolts are placed in the plurality of second bores 14 of the base 10, through the plurality of bores 16 of the flange adapter 15, and into the robot arm 78. Though the present invention has been described as including the flange adapter 15, any number of means known in the art may be used to mount the end effector 5 to the robot arm 78.

The vacuum chamber 32 has an opening or vacuum face 34 which is positioned in spaced relation relative to the port 12 (FIG. 9). The vacuum face 34 lies in a horizontal plane immediately above the ridged surfaces 24 of the sealing strips 22 and has a peripheral edge which is defined by the sealing strips 22 and two seal extensions or blades 40 and 45 (discussed below). In one form of the present invention, the vacuum face 34 has an area of about 100 square inches.

A first blade 40 having a point 41 pointing outward from the vacuum chamber 32, a substantially smooth surface 42, a grooved surface 43, and an end edge 44 is mounted on one of the second side walls 30. A second blade 45 having a point 46 pointing outward from the vacuum chamber 32, a substantially smooth surface 47, a grooved surface 48, and an end edge 49 is mounted on the other of the second side walls 30. The blades 40 and 45 are mounted in axial opposition to one another so that the respective grooved surfaces 43 and 48 face each other. Preferably, the blades 40 and 45 are pentagonal in shape, as shown. However, the blades may be square, circular, or otherwise shaped. In addition, the size of the blades may be varied. While blades of relatively large dimensions have been shown, it should be understood that smaller blades may be suitable under certain circumstances. In addition, while shown as blades, these components are, in function, seal extensions and may take the form of a lip.

In the preferred form, the blades have a thickness of about ⅛" and are made from a polymeric material such as nylon. A nylon suitable for use in the present invention is available under the trade designation Nylon 101 from one of many plastic distributors including Central Plastics Distributors in Madison, Wis.

The grooved surfaces 43 and 48 include a plurality of grooves 50, arranged in a predetermined pattern. Preferably, the pattern correlates to the shape of the blades such that grooves extend from within the vacuum chamber 32 to near the end edges 44 and 49 of the blades 40 and 45, generally perpendicular to the base 10. In one form, the grooves 50 are approximately ¼" wide and ¹⁄₁₆" deep. The inventor found that the grooves 50 provide a channel through which vacuum may travel down along the side of the stack of articles to be handled, thereby improving the vacuum grip and seal between the end effector 5 and the articles of interest. While it is thought that the highest level of performance may be achieved in a device having grooved blades, it is possible that the end effector 5 would still function if the surfaces 43 and 48 were substantially smooth.

As shown in FIG. 1, one or both of the blades 40 and 45 may optionally be fitted with a finger 60, having a first end 61 and a second end 62. One finger 60 is mounted on the blade 40 and is pivotable so that its first end 61 may move from a first position 64, where it is flush with the grooved surface 44, to a second position 65, shown in phantom lines, where it extends inwardly toward the opposite blade 46.

In addition, the end effector 5 may be equipped with a linear slide which permits one or both of the blades to be adjusted along an axis 70. As can be seen by reference to FIG. 4, the linear slide 68 may be coupled to one of the blades, while the other is stationary. It is also contemplated that the blades may pivot with respect to the base 10, rather than being fixed perpendicularly to it. When equipped with a linear slide 68, pivotal blades or one or more fingers 60, the end effector 5 is better able to handle uneven stacks of folded articles, as the dimensions of the vacuum chamber may be adjusted to better match the dimensions of the uneven stack. An uneven stack may be caused by the use of package inserts, which are commonly placed in folded containers. The inserts cause one portion of the folded container to be thicker than the rest, making the resulting stack of such containers uneven.

In use, the end effector 5 is coupled to a robot 75 having a base 76 and a robot arm 78 (FIG. 1). Mounted on the robot arm 78, adjacent to the end effector 5, may be a vacuum-type, material handling device 80. The device 80 includes a conventional, first suction effector 82 having a plurality of suction cups 83. The device 80 also includes a conventional, second suction effector 84 which has a plurality of suction cups 85. While the effectors 82 and 84 are shown as conventional, suction-cup type effectors, it is envisioned that they may be replaced with effectors similar to the end effector 5.

The effectors 82 and 84 are designed to handle and move shipping containers such as the boxes 90 shown in FIG. 1. The robot 75 may be programmed to pick and move a single box containing a stack 91 of folded, substantially flat paperboard containers from a palletized pile to a handling station or table (not shown) using the effectors 82 and 84. As shown in FIG. 6, pneumatic arms 100 having suction cups 105 then grab or contact the box, applying a suction force to the sidewalls thereof. The force causes the sidewall of the box 90 to bow outward, thus separating them from the end paperboard containers of the stack 91 contained within the box 90. The blades 40 and 45 may then slide between the end containers and the sidewalls of the box 90.

As the blades of the end effector 5 are maneuvered into the desired position, a suction force or vacuum pressure is created by a vacuum applied to the vacuum chamber 32 through the port 12. Once the sealing strips 22 contact the folded containers within the box 90, a vacuum seal is created along the vacuum face 34. In particular, the vacuum seal exists along each of the strips 22 and the grooved surfaces 43 and 48 of the blades 40 and 45. In order to pick up a load of about 40 pounds, the vacuum pressure in the vacuum chamber 32 should be maintained at a level of about 5 to about 10 inches of mercury. The vacuum pressure may be monitored by the vacuum sensor 17.

The gripping or holding force created by the vacuum seal along the vacuum face 34 holds the stack 91 of folded paperboard containers against the ridged surfaces 24 of the sealing strips 22. So gripped, the stack 91 of containers may be lifted and removed from the box 90 as shown in FIGS. 7 and 8. As seen in FIG. 9, the design of the present invention provides a superior vacuum seal along the entire peripheral edge of the vacuum face 34. Key to the present invention are the seal extensions or blades 40 and 45 which grip the end containers on each end of the stack 91 by ensuring appropriate vacuum. The blades thereby prevent a domino effect from occurring. When insufficient vacuum is present at the end of the stack 91 of containers, the end containers tend to fall from the end effector 5. Then successive containers fall from the end effector 5, like falling dominos, until the entire stack 91 is released from the vacuum grip of the end effector 5.

As noted above, preferably the blades 40 and 45 should be constructed from nylon. Regardless of the type of material from which they are constructed, the blades 40 and 45 should have sufficient stiffness to be insertable into a stack of articles, yet have some flexibility in order to maintain a vacuum seal along the vacuum face 34. Flexibility is important because once the articles have been removed from a container, the articles have a tendency to swing or pivot at the vacuum face 34. If flexible, the blades 40 and 45 may follow this pivoting, or at least minimize the gap tending to form between the blades 40, 45 and the articles, thereby maintaining the vacuum seal at the vacuum face 34.

While the present invention has been described in what is believed to be the most preferred form, it is to be understood that the invention is not confined to the particular construction and arrangement of the components herein illustrated and described, but embraces such modified forms thereof as come within the scope of the appended claims. For example, although the vacuum chamber 32 has been described and shown as having a generally rectangular shape, it could be variously shaped and sized according to the needs of the application at hand.

If the stack of articles of interest presented curved surfaces, a correspondingly curved vacuum chamber could be constructed. The size of the vacuum chamber could also be changed to fit the corresponding size of the stack of articles to be handled. Further, it is envisioned that an adjustable vacuum head or chamber could be constructed where both its size and shape could be altered to meet the requirements of various applications. Thus, an operable end effector may generally be obtained so long as a vacuum chamber having a vacuum face is provided. A suitable vacuum face and vacuum seal may be obtained in devices having a strip of sealing material mounted along a portion of the peripheral edge of the vacuum face, and a seal extension or blade mounted along the peripheral edge of the vacuum face adjacent to the strip of sealing material. In most applications a second seal extension or blade mounted along a third portion of the peripheral edge of the vacuum face, and a second strip of sealing material mounted along a fourth portion of the peripheral edge of the vacuum face will likely be needed.

Though the end effector has been described as having a separate body, sealing strips and blades, it is envisioned that the entire end effector 5 could be constructed as a single unit comprised of a single material.

What is claimed is:

1. An end effector for use with a robot, the end effector comprising:
    a body defining a vacuum chamber, the vacuum chamber having a port capable of being coupled to a vacuum source, the vacuum chamber further having;
    an opening positioned in spaced relation relative to the port and having a peripheral edge;
    a first strip of sealing material mounted along a portion of the peripheral edge of the opening; and
    a first blade for being inserted into a container holding a plurality of flattened articles and having a grooved surface, the first blade mounted along the peripheral edge of the opening adjacent to the strip of sealing material and along a second portion of the peripheral edge of the opening;
    wherein the end effector is capable of holding a plurality of stacked, substantially flat articles when the port is coupled to the vacuum source and a vacuum is being applied through the port.

2. An end effector as claimed in claim 1, further comprising a means for mounting the end effector to the robot.

3. An end effector as claimed in claim 1, further comprising
    a second strip of sealing material mounted along a third portion of the peripheral edge of the vacuum face; and
    a second blade for being inserted into a container holding a plurality of flattened articles and having a grooved surface, the second blade mounted along a fourth portion of the peripheral edge of the opening and adjacent to both the first strip of sealing material and the second strip of sealing material.

4. An end effector as claimed in claim 3, and wherein the the first and second blades are pentagonally shaped.

5. An end effector as claimed in claim 3, and wherein the the first and second blades are manufactured from polymeric material.

6. An end effector as claimed in claim 3, and wherein the vacuum chamber includes a linear slide which permits one of the blades to move along an axis.

7. An end effector as claimed in claim 1, and wherein the vacuum chamber further includes a plurality of bores, the plurality of bores positioned in the vacuum chamber according to a predetermined pattern.

8. An end effector as claimed in claim 7, further comprising a flange having a plurality of bores and mounted to the vacuum chamber so that the plurality of bores of the flange are aligned with the plurality of bores of the vacuum chamber.

9. An end effector as claimed in claim 1, and wherein the body is manufactured from stainless steel.

10. An end effector as claimed in claim 1, further comprising a vacuum sensor mounted on the vacuum chamber and capable of sensing the vacuum pressure in the vacuum chamber.

11. A vacuum chamber capable of being mounted on a robot arm, the vacuum chamber comprising:

a base having a peripheral edge and a first bore, the first bore capable of being coupled to a vacuum source;

a pair of first side walls mounted on the base, near the peripheral edge, each of the first side walls having a strip-like surface, the first side walls mounted on the base so as to be substantially perpendicular thereto;

a first strip of sealing material mounted on the strip-like surface of one of the first side walls;

a second strip of sealing material mounted on the strip-like surface of the other of the first side walls;

a pair of second side walls mounted on the base, near the peripheral edge, the second side walls mounted on the base so as to be substantially perpendicular thereto;

a first blade for being inserted into a container holding a plurality of flattened articles and having a grooved surface, the first blade mounted on one of the second side walls; and a second blade for being inserted into a container holding a plurality of flattened articles and having a grooved surface, the second blade mounted on the other of the second side walls.

12. A vacuum chamber as claimed in claim 11, further comprising a means for connecting the base to the robot.

13. A vacuum chamber as claimed in claim 11, and wherein the first and second blades are pentagonally shaped.

14. A vacuum chamber as claimed in claim 11, and wherein the first and second blades are manufactured from polymeric material.

15. A vacuum chamber as claimed in claim 11, and wherein the base further includes a plurality of second bores, the plurality of second bores positioned in the base according to a predetermined pattern.

16. A vacuum chamber as claimed in claim 15, further comprising a flange having a plurality of bores and mounted to the base so that the plurality of bores of the flange are aligned with the plurality of second bores of the base.

17. A vacuum chamber as claimed in claim 11, and wherein the base, the pair of first side walls, and the pair of second side walls are manufactured from steel.

18. A vacuum chamber as claimed in claim 11, and wherein the base, the pair of first side walls, and the pair of second side walls are integral with one another.

19. An industrial robot comprising:

a robot arm; and an end effector mounted on the robot arm, the end effector including:

a body defining a vacuum chamber, the vacuum chamber having a port capable of being coupled to a vacuum source, the vacuum chamber further having:

an opening positioned in spaced relation relative to the port and having a peripheral edge;

a first strip of sealing material mounted along a portion of the peripheral edge of the opening; and a first blade for being inserted into a container holding a plurality of flattened articles and having a grooved surface, the first blade mounted along the peripheral edge of the opening adjacent to the strip of sealing material, and along a second portion of the peripheral edge of the opening;

wherein the end effector is capable of holding a plurality of stacked, substantially flat articles when the port is coupled to the vacuum source and a vacuum is being applied through the port.

20. An industrial robot as claimed in claim 19, further comprising a means for mounting the end effector to the robot.

21. An industrial robot as claimed in claim 19, further comprising a second strip of sealing material mounted on a third portion of the peripheral edge of the vacuum face; and a blade for being inserted into a container holding a plurality of flattened articles and having a grooved surface, the second blade mounted on a fourth portion of the peripheral edge of the vacuum face and adjacent to both the first strip of sealing material and the second strip of sealing material.

22. An industrial robot as claimed in claim 21, and wherein the first and second blades are pentagonally shaped.

23. An industrial robot as claimed in claim 21, and wherein the the first and second blades are manufactured from polymeric material.

24. An industrial robot as claimed in claim 19, and wherein the vacuum chamber includes a linear slide which permits one of the blades to move along an axis.

25. An industrial robot as claimed in claim 19, and wherein the vacuum chamber further includes a plurality of bores, the plurality of bores positioned in the vacuum chamber according to a predetermined pattern.

26. An industrial robot as claimed in claim 25, further comprising a flange having a plurality of bores and mounted to the vacuum chamber so that the plurality of bores of the flange are aligned with the plurality of bores of the vacuum chamber.

27. An industrial robot as claimed in claim 19, and wherein the body is manufactured from stainless steel.

28. An industrial robot as claimed in claim 19, further comprising a vacuum sensor mounted on the vacuum chamber and capable of sensing the vacuum pressure in the vacuum chamber.

* * * * *